Dec. 30, 1969 N. L. SORLIE 3,486,703
FOOD WASTE GRINDER HOPPER
Filed Oct. 3, 1966

INVENTOR
NORMAN L. SORLIE
BY Hofgren, Wegner, Allen,
Stellman & McCord
ATTORNEYS United States Patent Office 3,486,703
Patented Dec. 30, 1969

1

3,486,703
FOOD WASTE GRINDER HOPPER
Norman L. Sorlie, Minneapolis, Minn., assignor to Whirlpool Corporation, a corporation of Delaware
Filed Oct. 3, 1966, Ser. No. 583,567
Int. Cl. B02c 18/42
U.S. Cl. 241—100.5                                    1 Claim

ABSTRACT OF THE DISCLOSURE

A hopper in a food waste grinder such as is normally used in a kitchen sink for grinding food waste before flushing it into the sewer with the hopper comprising an enclosing continuous hopper wall of sheet metal of grinding hardness having an integral ring portion of the hopper wall with inwardly projecting shredder teeth.

This invention relates to a food waste grinder and particularly to the hopper or chamber and to a method of making the hopper.

Food waste grinders are connected to the drains of kitchen sinks and include a hopper or chamber that receives the waste, a shredder ring in the chamber and a rotatable impeller structure that propels the food waste against the teeth of the shredder ring to reduce it to sufficienly small size so that it can be flushed into the sewer with a stream of water. One of the features of this invention is to provide a food waste grinder hopper wherein the enclosing chamber wall is of sheet metal of grinding hardness of the nature of stainless steel or the like, with the wall having a ring portion with inwardly projecting shredder teeth portions formed therein so that the ring and shredder teeth are integral parts of the sheet metal of the enclosing wall.

Another feature of the invention is to provide an improved method of making an enclosing wall for a food waste grinder hopper in which a blank of sheet metal of grinding hardness is formed that is smaller in cross section than the hopper wall followed by internally stretching this blank to the size, shape and contour of the wall, as in a hollow die, followed by forming a series of inwardly projecting teeth portions in a ring portion of this wall.

Other features and advantages of the invention will be apparent from the following description of one embodiment thereof taken in conjunction with the accompanying drawings. Of the drawings.

Figure 1:
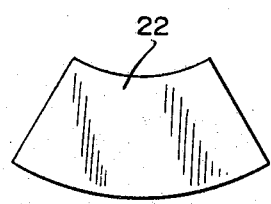
FIGURE 1 is a plan view of a flat pattern of sheet metal used in making the hopper wall.

In the food waste grinder hopper of this invention the entire hopper 10 has a wall 11 of sheet metal of grinding hardness of which stainless steel is a good example. This wall has an upper 12 entrance end and a lower 13 exit end as well as a longitudinal central axis. The wall 11 is of approximately cylindrical shape except smaller at the upper end 12 than at the lower end, as is customary in such hoppers. Formed in the wall 11 is a ring portion 14 provided with spaced inwardly projecting shredder teeth portions 15 which function in the usual way in conjunc-

2 tion with rotatable impellers (not shown) to reduce the food waste to small particles that can be flushed into the sewer. As can be seen, the ring portion 14 is generally in a plane at right angles to the central axis of the hopper wall 11.

In the illustrated embodiment there are provided a plurality of rings each containing shredder or breaker teeth portions. Then, as illustrated, there is another ring portion 16 above the ring portion 14 and containing a plurality, here three, of inwardly projecting teeth 17. In this embodiment, as is evident from the drawings, the rings are spaced from each other and have successively greater numbers of teeth toward the lower end 13 of the hopper wall 11.

In the preferred embodiment, as illustrated in the drawings, the lowermost ring 14 comprises groups of teeth 15 with adjacent groups interspersed with vertically longer teeth 18. Also, in this preferred embodiment, the uppermost ring portion 16 includes an outwardly flared first shoulder portion 19 extending around the wall 11 while the lowermost ring 14 has immediately beneath it an outwardly flared second shoulder portion 20 of greater lateral extent than the first shoulder portion 19.

The wall 11 at its extreme bottom has a step portion 21 as an outwardly projecting annular flange that cooperates with the motor housing (not shown) to mount the motor to the grinder hopper 10.

The teeth arrangement in the preferred illustrated structure are designed to break up and reduce large pieces of food waste to small particles before the waste passes from the grinder. Thus, the widely spaced teeth in the upper ring portion 16 function to break up large pieces of food waste material into smaller pieces. In the lower ring portion 14 the vertically long teeth 18 assist in breaking up the waste material into small pieces which are thereupon reduced to disposable particles primarily by contacting with the short teeth 15.

Figure 2:
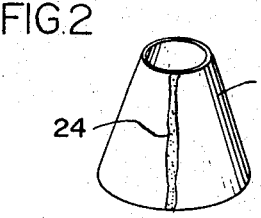
FIGURE 2 is a perspective view of a blank for forming this wall.
Figure 3:
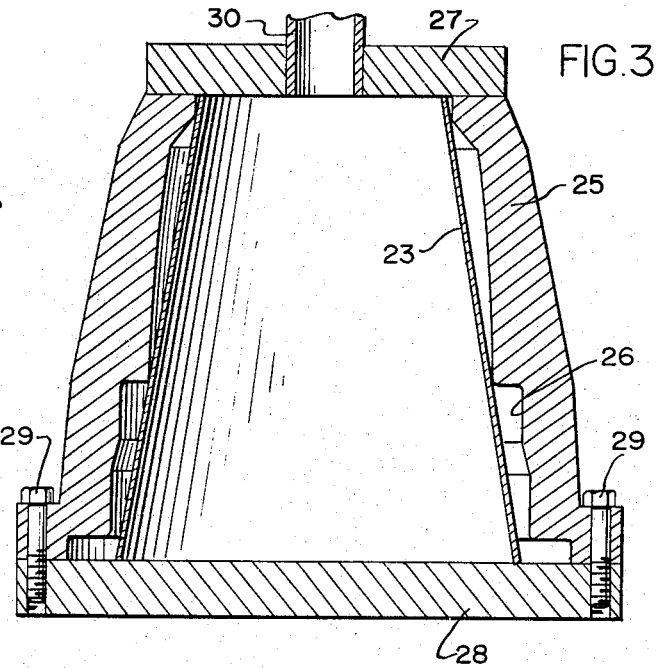
FIGURE 3 is a vertical section through a hollow die in which the blank is internally stretched to the size, shape and contour of the wall.

One method of forming the hopper wall 11 is illustrated in FIGURES 1-3. As is shown here a blank 22 of metal of grinding hardness such as stainless steel is formed to the shape of a truncated cone 23 by seam welding as illustrated at 24. This truncated cone is smaller in cross section than the finished hopper wall 11. In forming the wall 11 from the conical blank 23 this blank is placed in a hollow die 25 whose internal surface 26 is of substantially the same size, shape and dimensions as the outer surface of the completed wall 11. The upper end of the die 25 is sealed by a plate 27 while the lower end is similarly sealed by a removable plate 28 held in place as by screws 29. A pipe 30 for hydraulic liquid extends through the top plate 27 to communicate with the interior of the blank 23. Then, when hydraulic fluid under pressure is admitted to the interior of the blank 23 it is internally stretched by this hydroforming operation outwardly until it assumes the shape and dimensions of the internal surface 26.

After so being shaped, the teeth 15, 17 and 18 are formed in the wall as by a rolling operation. If desired, of course, the teeth and particularly the longer teeth 17 may be formed during the blank shaping operation by providing suitably shaped inwardly projecting sections on the die 25.

Figures 4, 5:
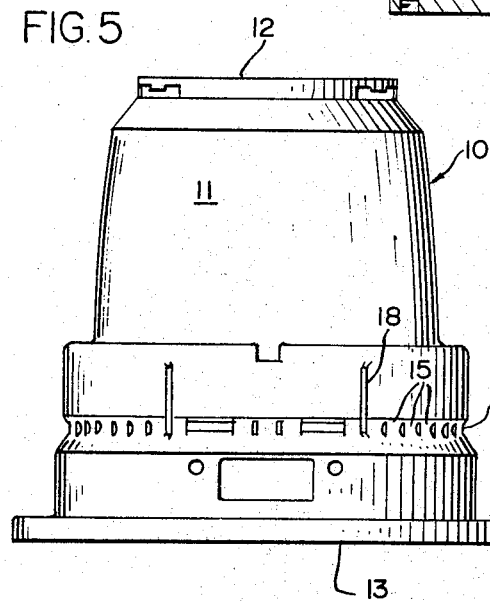
FIGURE 4 is a view partially in section and partially in side elevation of an enclosing wall for a food waste grinder hopper.
FIGURE 5 is a side elevational view of the hopper wall.
Figure 6:
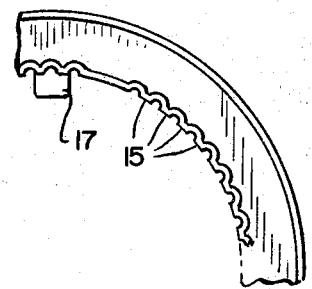
FIGURE 6 is a fragmentary bottom elevational view of the hopper wall of FIGURE 5.

An alternate method of forming hopper wall 11 would be to draw the cone 23 of material, shown in FIGURE 2, into the shape of FIGURE 5 (without teeth) with male and female drawn dies. Then the teeth 15 could be formed into the blank shape of FIGURE 5 by stamping or by roll forming.

The terminology used herein specifies the ring or rings and the teeth as being portions of the enclosing wall. This term is used in its dictionary meaning which identifies the word portion as "a part of a whole, a constituent part" to distinguish over food waste grinder hopper walls made of one metal with separate shredder rings attached thereto.

Having described my invention as related to the embodiment shown in the accompanying drawings, it is my intention that the invention be not limited by any of the details of description, unless otherwise specified, but rather be construed broadly within its spirit and scope as set out in the accompanying claim.

The embodiment of the invention in which an exclusive property or privilege is claimed is defined as follows:

1. A food waste grinder hopper comprising: an enclosing continuous hopper wall of sheet metal of grinding hardness having an integral ring portion of said hopper wall with inwardly projecting shredder teeth, said wall having an upper entrance end, a lower exit end and a longitudinal central axis, and said ring portion includes a plurality of said rings spaced from each other and located adjacent said lower end, each ring being in a plane substantially transverse to said axis, said rings have successively greater numbers of said teeth toward said lower end, the uppermost ring including an outwardly flared first shoulder portion and the lowermost ring having immediately beneath it an outwardly flared second shoulder portion of said wall of greater lateral extent than said first shoulder portion.

References Cited

UNITED STATES PATENTS

| | | | |
|---|---|---|---|
| 2,322,058 | 6/1943 | Powers | 241—46.1 |
| 2,772,836 | 12/1956 | Gebhart | 241—100.5 |
| 2,870,970 | 1/1959 | Williamson | 241—46.1 |
| 2,940,677 | 6/1960 | Jordan | 241—100.5 |
| 3,151,815 | 10/1964 | Ohime | 241—46.1 |
| 3,246,132 | 4/1966 | Jordan et al. | 241—100.5 |

FOREIGN PATENTS 1,076,649  10/1954  France.

GERALD A. DOST, Primary Examiner

U.S. Cl. X.R.

72—61, 367; 241—46